US007204232B2

(12) United States Patent
Matsuda

(10) Patent No.: US 7,204,232 B2
(45) Date of Patent: Apr. 17, 2007

(54) CARBURETOR ELECTRICALLY-OPERATED AUTOMATIC CHOKE SYSTEM

(75) Inventor: Hayato Matsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 11/199,369

(22) Filed: Aug. 9, 2005

(65) Prior Publication Data

US 2006/0042595 A1 Mar. 2, 2006

(30) Foreign Application Priority Data

Aug. 26, 2004 (JP) ............................ 2004-246531

(51) Int. Cl.
*F02M 1/00* (2006.01)
*B01D 47/00* (2006.01)

(52) U.S. Cl. ................. 123/438; 123/179.15; 261/64.1

(58) Field of Classification Search ................ 123/437, 123/438, 179.15, 179.16; 261/39.3, 64.1, 261/DIG. 73
See application file for complete search history.

(56) References Cited

U.S. PATENT DOCUMENTS 4,096,837 A * 6/1978 Iiyama et al. ............... 123/435
4,524,742 A * 6/1985 Bonfiglioli et al. ......... 123/438
5,660,765 A * 8/1997 King et al. ................ 261/39.3
2006/0037574 A1* 2/2006 Matsuda et al. ....... 123/179.18
2006/0038305 A1* 2/2006 Bungo et al. .............. 261/64.1
2006/0102126 A1* 5/2006 Nakata et al. ......... 123/179.15

FOREIGN PATENT DOCUMENTS

JP 58-155255 9/1983

* cited by examiner

*Primary Examiner*—John T. Kwon
(74) *Attorney, Agent, or Firm*—Arent Fox LLP

(57) ABSTRACT

An electrically-operated automatic choke system of a carburetor includes a choke valve connected to a choke valve closure spring that urges the choke valve in a direction to close it. A wax-type temperature sensitive actuating device is coupled to the carburetor to receive heat generated by an engine. A piston member of the device faces a pivoting member coupled to the choke valve and makes contact with, or moves away from, the pivoting member on a pivoting path to the closed side of the choke valve. While the engine has stopped running, closure of the choke valve by the choke valve closure spring is restricted according to the amount the piston member protrudes.

10 Claims, 6 Drawing Sheets

CARBURETOR ELECTRICALLY-OPERATED AUTOMATIC CHOKE SYSTEM

RELATED APPLICATION DATA

The Japanese priority application No. 2004-246531 upon which the present application is based is hereby incorporated in its entirety herein by reference.

BACKGROUND OF THE INVENTION

1. Field of the Invention

The present invention relates to a carburetor having an electrically-operated automatic choke system that is primarily applied to a general purpose engine, and particularly, to an electrically-operated automatic choke-system that includes an electric motor, a transmission device for transmitting a driving torque of the electric motor to a choke valve of the carburetor in directions to open and close the choke valve, and an electronic control unit for controlling operation of the electric motor.

2. Description of the Related Art

Such an electrically-operated automatic choke system of a carburetor is known from, for example, Japanese Patent Application Laid-open No. 58-155255.

Since a conventional electrically-operated automatic choke system operates so that a choke valve is held at a fully open position when an engine is in a hot running state, the fully open state of the choke valve is maintained even after the engine stops running. Therefore, when the engine is cold-started, an electric motor operates to fully close the choke valve.

However, in the case where the system has no battery and an electric motor is operated using power generated by a generator driven by an engine, or, in the case where the system has a battery but the amount of electricity stored in the battery is insufficient while being cold-started, even if the electric motor does not operate, the choke valve remains open, and a rich air-fuel mixture suitable for a cold start cannot be generated in an intake path of the carburetor, making it difficult to start the engine.

SUMMARY OF THE INVENTION

The present invention has been accomplished in view of such circumstances. It is an aspect of the present invention to provide a carburetor with an electrically-operated automatic choke system capable of automatically controlling the opening degree of a choke valve to a start opening degree that corresponds to an engine temperature even when the engine has stopped running. It is also an aspect of the present invention to provide an electrically-operated automatic choke system that reliably starts the engine regardless of whether the engine is cold, hot, and/or when an electric motor is in an inoperable state.

In order to achieve the above-mentioned aspects, according to the present invention, there is provided a carburetor with an electrically-operated automatic choke system that includes an electric motor as well as a transmission device which transmits a drive torque of the electric motor to a choke valve of the carburetor in directions that open and close the choke valve. An electronic control unit controls operation of the electric motor while a choke valve closure spring connected to the choke valve urges the choke valve in a direction to close the choke valve. A wax-type temperature sensitive actuating device is mounted on the carburetor or onto a fixed structure connected to the carburetor, and has a piston member that protrudes therefrom upon thermal expansion of a wax therein. The temperature sensitive actuating device directly, or indirectly, receives heat generated by the engine. A pivoting member is coupled to the choke valve wherein the piston member faces the pivoting member to make contact with, or move away from, the pivoting member on a pivoting path to a closed side of the choke valve. As such, closure of the choke valve by the choke valve closure spring is restricted according to the amount the piston member protrudes when the engine has stopped running.

The pivoting member corresponds to a non-constant speed driven gear of a first embodiment and a stop lever of a second embodiment of the present invention which will be described later.

With the above-described features of the present invention, while the engine is running, the electric motor, which is controlled by the electronic control unit, drives the choke valve to an appropriate opening degree according to a rise or fall in the temperature of the engine, thus supplying an air-fuel mixture of an appropriate concentration to the engine. Furthermore, when the engine stops running, the choke valve closure spring and the wax-type temperature sensitive actuating device cooperate with each other such that the opening degree of the choke valve is automatically controlled to a start opening degree that corresponds to the engine temperature. Therefore, it is possible to reliably start the engine, regardless of whether the engine is cold or hot, even when the electric motor is in an inoperable state while the engine is being started.

The wax-type temperature sensitive actuating device is relatively slow to respond to incoming heat. As such, the device does not follow the opening of the choke valve by the electric motor after the engine is cold-started. Accordingly, the device does not impede the electric motor from opening the choke valve.

The above-mentioned aspects, other aspects, characteristics, and advantages of the present invention will become apparent from preferred embodiments that will be described in detail below by reference to the attached drawings.

DESCRIPTION OF PREFERRED EMBODIMENTS

Figure 1:
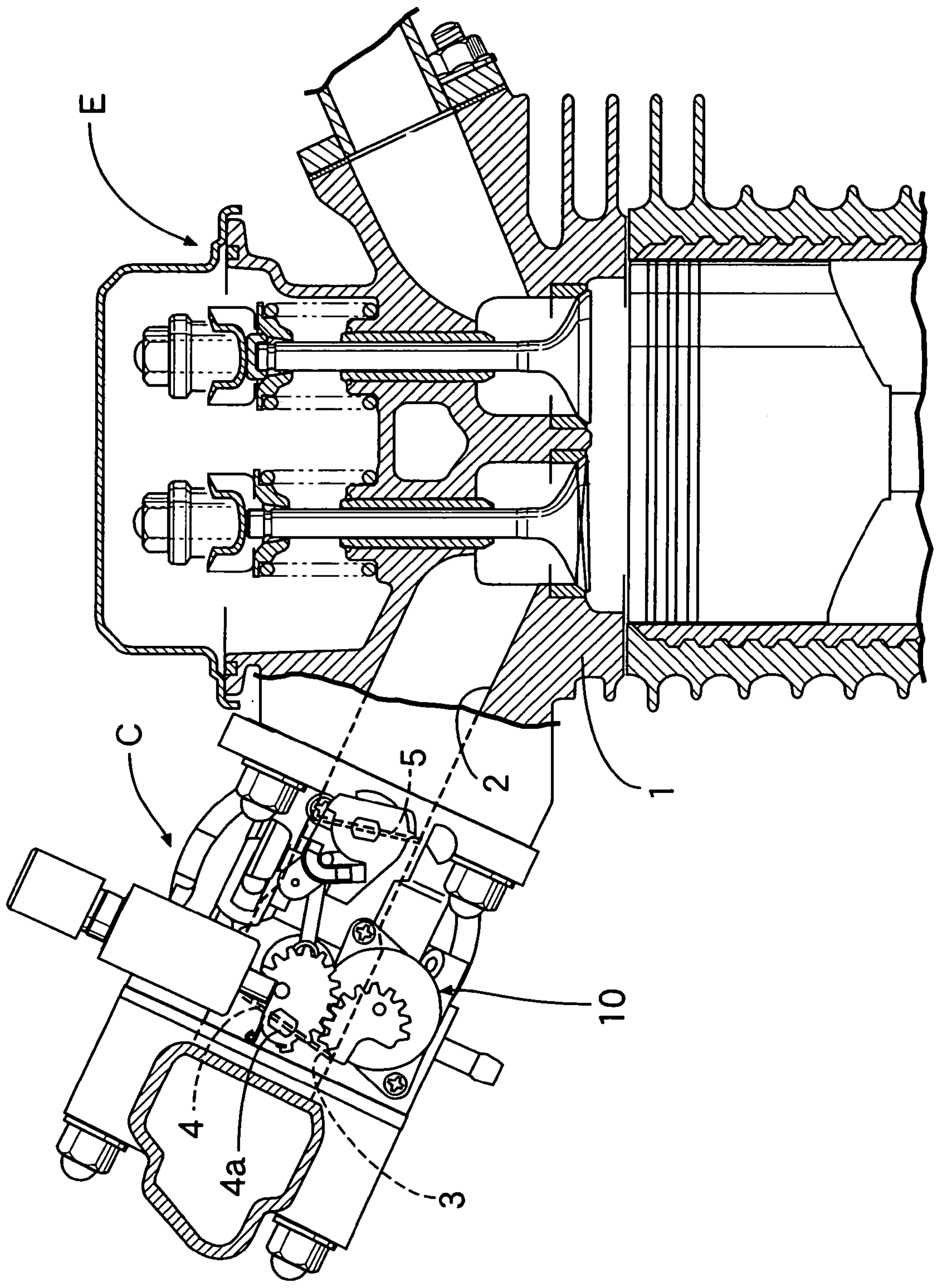
FIG. 1 is a cross-sectional plan view of a portion of a general purpose engine equipped with a carburetor having an electrically-operated automatic choke system according to a first embodiment of the present invention.

Referring to FIG. 1, a carburetor C is mounted on a side face of a cylinder head 1 of a general purpose engine E. The carburetor C has an intake path 3 that communicates with an intake port 2 within the cylinder head 1. A choke valve 4 and a throttle valve 5 are sequentially disposed in the intake path 3 from the upstream side. A fuel nozzle (not illustrated) opens in a venturi part of the intake path 3 in a middle section between the choke and throttle valves 4 and 5. Both the choke valve 4 and the throttle valve 5 are butterfly-type valves that are opened and closed by pivoting of corresponding valve shafts 4*a* and 5*a*.

Figure 2:
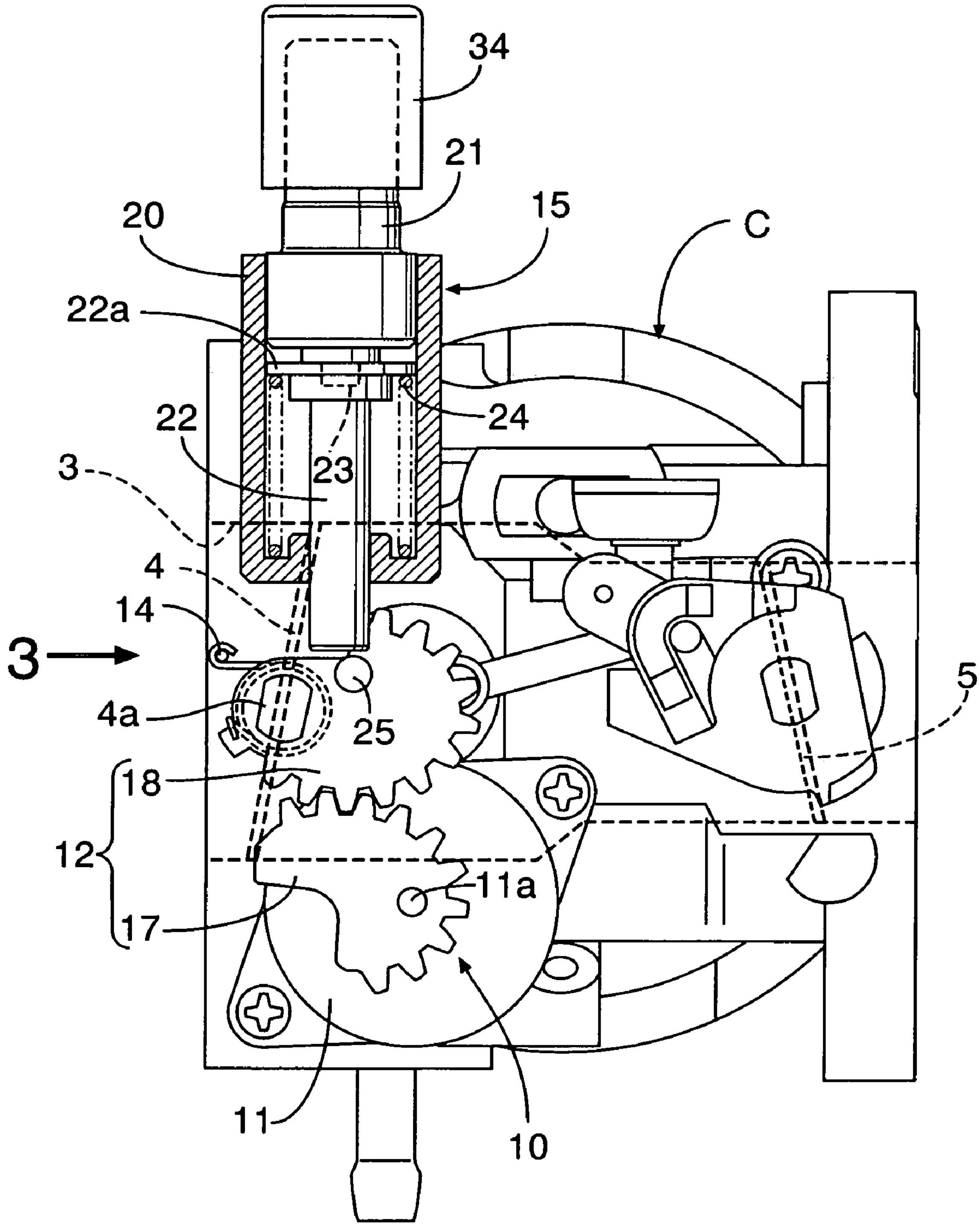
FIG. 2 is a vertical, cross-sectional view of a portion of the carburetor in FIG. 1.
Figure 3:
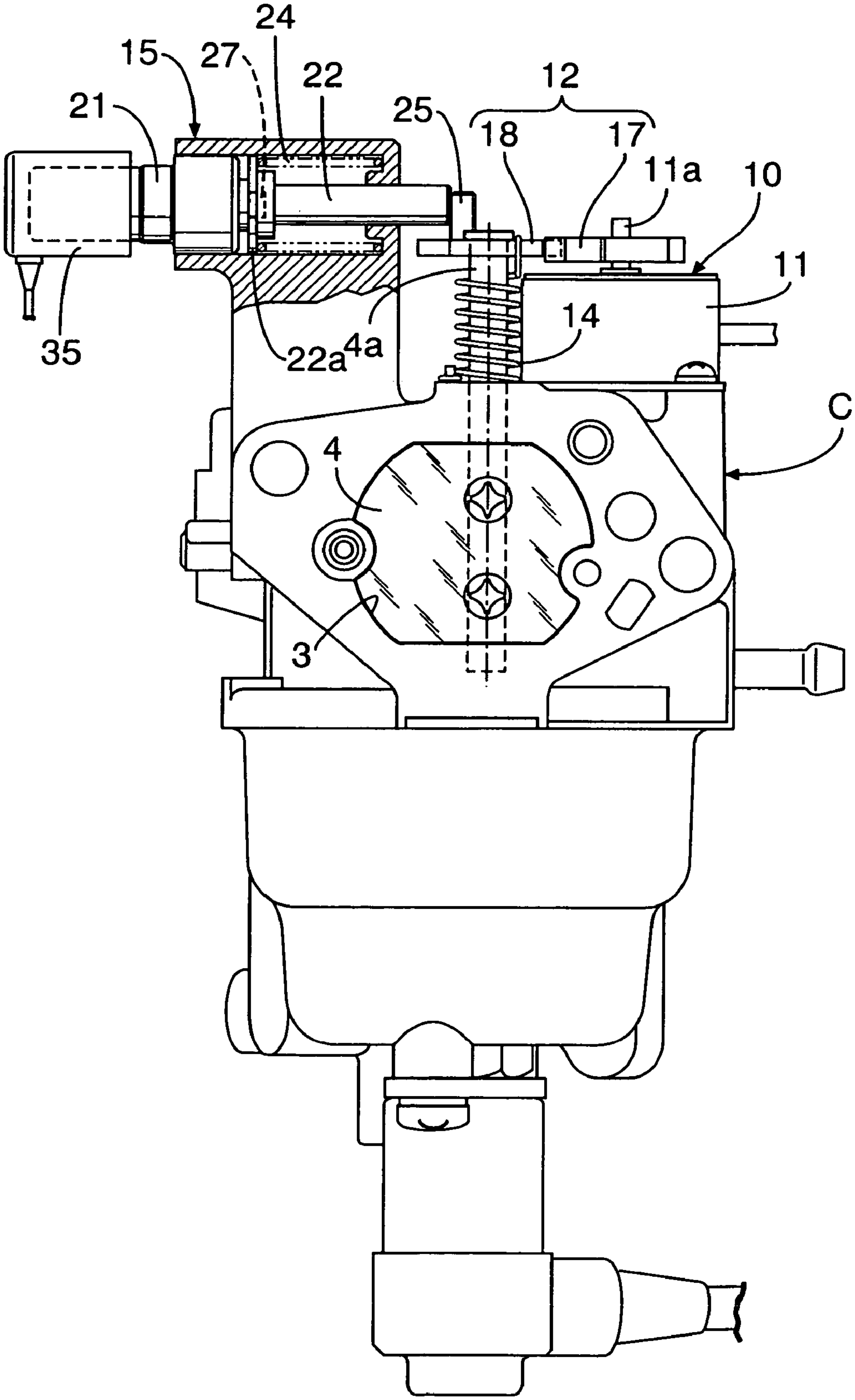
FIG. 3 is a view taken from arrow 3 in FIG. 2.
Figure 4:
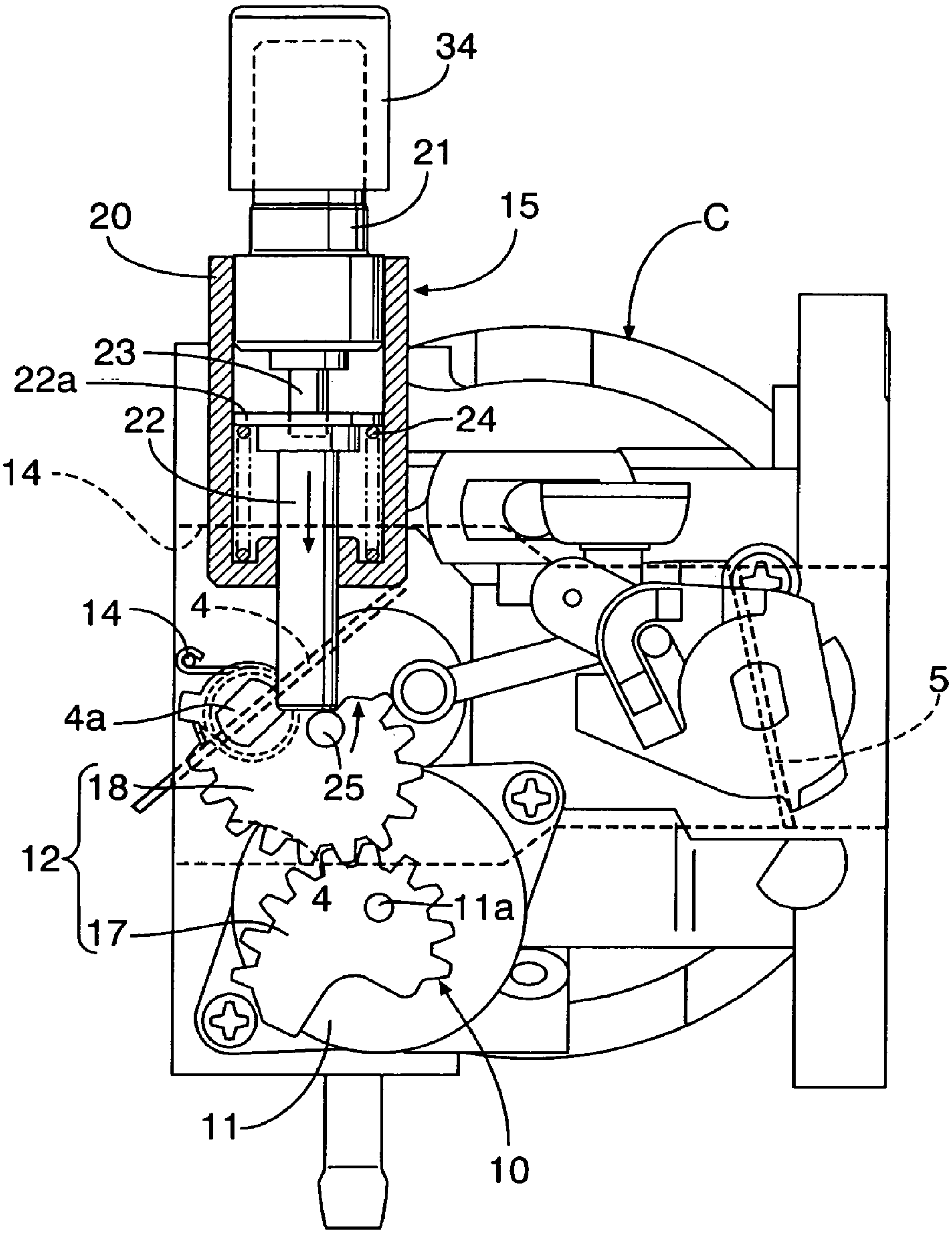
FIG. 4 is the cross-sectional view shown in FIG. 2 slightly modified for explaining operation of the present invention.

As shown in FIG. 2 and FIG. 3, a choke valve shaft 4*a* of the choke valve 4 is positioned offset to one side from the center of the intake path 3. The choke valve 4 is inclined relative to the central axis of the intake path 3 so that, in a fully closed state, a side of the choke valve 4 having a larger rotational radius is on the downstream side of the intake path 3 relative to a side of the choke valve 4 having a smaller rotational radius. Therefore, when the choke valve 4 is fully closed, a valve opening force acts on the choke valve 4 because of the difference between the rotational moment due to an intake negative pressure of the engine E acting on the side of the choke valve 4 that has the larger rotational radius and the rotational moment due to the intake negative pressure of the engine E acting on the side of the choke valve 4 that has the smaller rotational radius.

An electrically-operated automatic choke system 10 is mounted on the carburetor C and automatically controls the opening degree of the choke valve 4. The electrically-operated automatic choke system 10 includes an electric motor 11, a transmission device 12, an electronic control unit 13 (see FIG. 5), a choke valve closure spring 14, and a wax-type temperature sensitive actuating device 15. The electric motor 11 is, for example, a stepping motor mounted on an upper end face of the carburetor C. The transmission device 12 transfers the output torque of the electric motor 11 to the choke valve 4 in directions that open and close the choke valve 4. The electronic control unit 13 controls operation of the electric motor 11. The choke valve closure spring 14 urges the choke valve 4 in a closing direction. The wax-type temperature sensitive actuating device 15 restricts the choke valve 4 from being closed by the choke valve closure spring 14 according to a rise or fall in the temperature of the engine E. The choke valve closure spring 14 is given a set load that enables the choke valve 4 to be fully closed against an idling torque of the electric motor 11.

The transmission device 12 includes a non-constant speed drive gear 17 secured to an output shaft 11*a* of the electric motor 11, and a non-constant speed driven gear 18 that is secured to an end part of the choke valve shaft 4*a* protruding outside the carburetor C, wherein the driven gear 18 meshes with the non-constant speed drive gear 17. The choke valve closure spring 14, which is a torsional coil spring that urges the non-constant speed driven gear 18 in a closing direction of the choke valve 4, is connected to the non-constant speed driven gear 18.

The non-constant speed drive and driven gears 17 and 18 reduce the speed of the driving torque of the electric motor 11 and transfer it to the choke valve shaft 4*a*. The gears 17 and 18 are both formed from part of an elliptic gear or an eccentric gear and are set so that the reduction ratio between the two gears 17 and 18 is a maximum when the choke valve 4 is positioned at an opening degree of about ¾ fully opened. This arrangement is a result of noting that, except for the fully closed state of the choke valve 4, the torque for opening the choke valve 4, generated by an intake negative pressure within the intake path 3, becomes a maximum at an opening degree of the choke valve 4 of about ¾. With this setting of the reduction ratio, the capacity of the electric motor 11 is reduced and the set load of the choke valve closure spring 14 is minimized.

The wax-type temperature sensitive actuating device 15 includes a cylinder 20 secured to the carburetor C, a wax case 21 enclosing wax therein and mounted on the inner periphery of one end part of the cylinder 20, and a piston member 22 slidably supported on a wall of the other end of the cylinder 20 and having a tip end protruding outside the cylinder 20. An output rod 23 is provided in the wax case 21 and protrudes toward the piston member 22 in response to thermal expansion of the wax within the wax case 21. A flange 22*a* is integrally formed with the inner end of the piston member 22 and abuts against the tip end of the output rod 23. A return spring 24 is housed within the cylinder 20 and urges the flange 22*a* in a direction to abut against the output rod 23. Thus, when the wax within the wax case 21 expands, the output rod 23 causes the piston member 22 to advance outward from the cylinder 20. When the wax contracts, the return spring 24 causes the piston member 22 to retract.

A PTC heater 34 is attached to an outer end part of the wax case 21 that projects outside the cylinder 20 to heat the wax case 21 according to an increase in temperature of the engine E.

The temperature sensitive actuating device 15, having the above-mentioned arrangement, is positioned wherein the protruding tip end of the piston member 22 faces the non-constant speed driven gear 18 to make contact with, or move away from, the gear 18 on a pivoting path to the closed side of the choke valve 4. In the case of the illustrated example, the tip end of the piston member 22 is positioned to face one side face of a stopper pin 25 on the closed side of the choke valve 4. The stopper pin 25 is projectingly provided in an integrated manner with a side face of the non-constant speed driven gear 18. When the engine E is stopped while hot, closure of the choke valve 4 by the choke valve closure spring 14 is restricted by the stopper pin 25 catching on the protruding piston member 22. In the case of the illustrated example, the choke valve 4 is restricted at a half-opened state.

Figure 5:
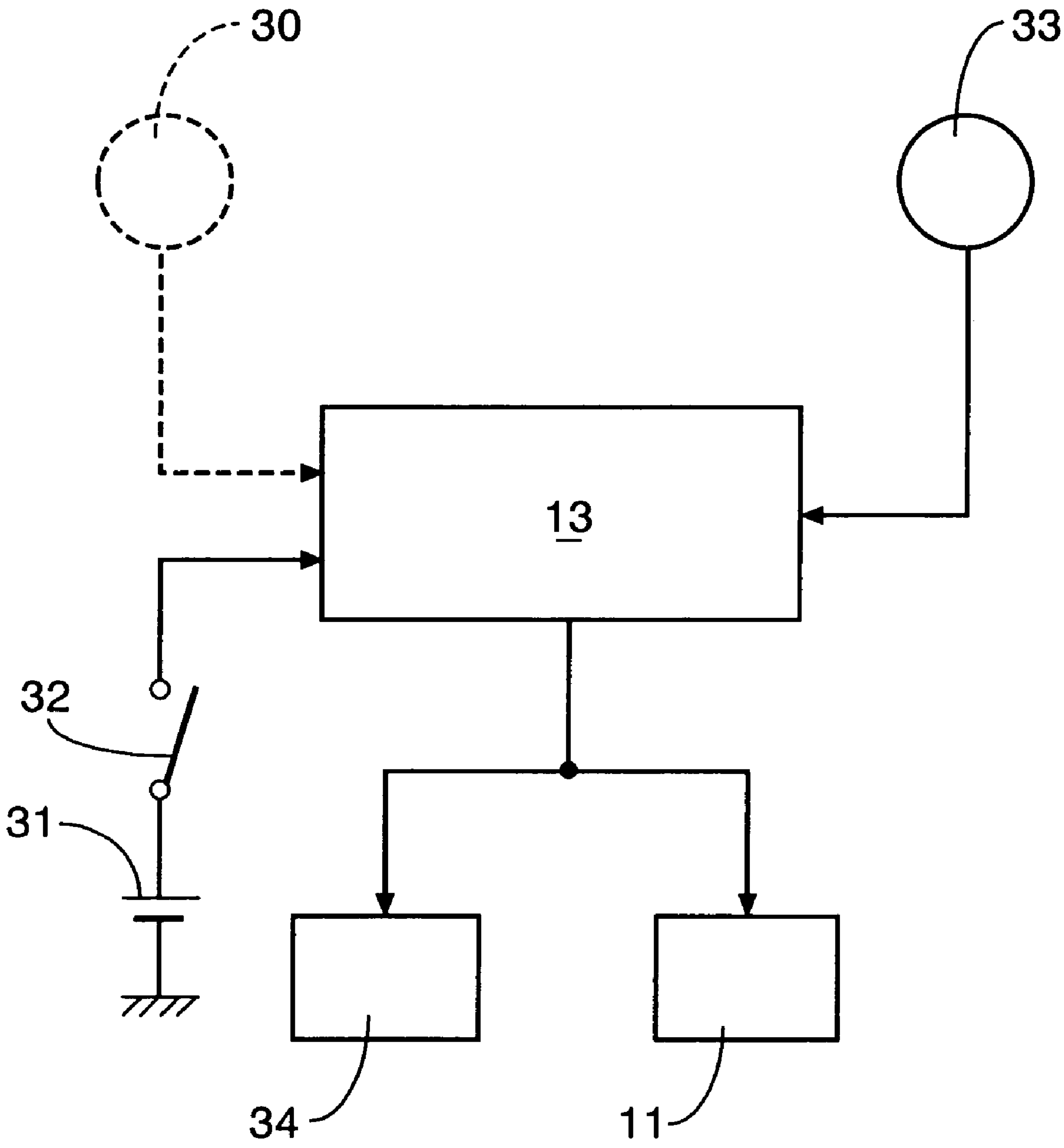
FIG. 5 is a schematic diagram of an electric circuit including an electronic control unit.

As shown in FIG. 5, electric power generated by a generator 30 of the engine E or electric power via a main switch 32 of a battery 31 is input into the electronic control unit 13 to control operation of the electric motor 11. Also, input thereto is an output signal of a temperature sensor 33 which detects the temperature of a heat generating part (for example, the cylinder head 1) of the engine E as the engine temperature. The electronic control unit 13 operates the electric motor 11 in response to a rise or fall in the engine temperature and energizes the PTC heater 34.

The operation of the above-described embodiment is now explained.

When the engine E is in a cold-stopped state, the temperature sensitive actuating device 15 causes the piston member 22 to retract from the stopper pin 25 of the non-constant speed driven gear 18, as shown in FIG. 2, by means of the wax within the contracting wax case 21 and the urging force of the return spring 24. Therefore, the choke valve 4 is moved to the fully closed position due to the set load of the choke valve closure spring 14 without interference from the piston member 22. Thus, by operating a recoil starter to crank the engine E, an air-fuel mixture having a relatively high concentration is formed in the intake path 3 of the carburetor C so that the engine E is always easily started. That is, in the case where there is no battery and the electric motor 11 is operated by electric power generated by a generator driven by the engine, or, in the case where the battery 31 is provided but the amount of electricity stored in the battery is insufficient, even if the electric motor is inoperable during cold-starting, good engine starting performance is ensured by maintaining the fully closed state of the choke valve 4 via the choke valve closure spring 14.

When the engine E is started, the electric power generated by the generator 30 driven by the engine E or the electric power of the battery 31, whose function recovers due to the operation of the generator of the engine E, is input into the electronic control unit 13. Then, the electronic control unit 13 operates the electric motor 11 according to an output signal from the temperature sensor 33, drives the choke valve 4 via the transmission device 12, and gives the choke valve 4 a warming-up opening degree according to the engine temperature. Therefore, when the engine temperature increases as the engine progressively warms up, the electronic control unit 13 operates the electric motor 11 based on the output signal of the temperature sensor 33, which changes according to the engine temperature, and starts to open the choke valve 4 via the transmission device 12, thus decreasing the concentration of the air-fuel mixture generated in the intake path 3 to ensure good warming-up conditions of the engine E. When the warming-up is completed, the choke valve 4 is maintained in the fully open state by the electric motor 11.

After the engine is started, the PTC heater 34 receives the supply of electricity from the electronic control unit 13 according to an increase in the engine temperature, and heats the wax case 21 in the temperature sensitive actuating device 15. Therefore, the wax within the wax case 21 expands in response to the increase in engine temperature, wherein the output rod 23 causes the piston member 22 to protrude toward the stopper pin 25 of the non-constant speed driven gear 18 of the transmission device 12. When the temperature of the PTC heater 34 exceeds a predetermined value, the electrical resistance thereof rapidly increases, and the amount of electricity passing decreases, wherein excessive increase in the temperature is automatically suppressed. Therefore, a constant protruding state of the piston member 22 is maintained while the engine E is hot. Since the wax-type temperature sensitive actuating device 15 is relatively slow to respond to incoming heat, it does not follow the opening of the choke valve 4 by the electric motor 11. Upon opening of the choke valve 4, the stopper pin 25 of the non-constant speed driven gear 18 simply moves away from the piston member 22 of the temperature sensitive actuating device 15. Thus, the temperature sensitive actuating device 15 never impedes the opening of the choke valve 4 by the electric motor 11.

Subsequently, when the engine E stops running while hot, the choke valve 4, which is opened due to the drive from the electric motor 11, attempts to return to the fully closed position due to the urging force provided by the choke valve closure spring 14 as described above. However, when the choke valve 4 comes to a predetermined half-open position, the stopper pin 25 of the non-constant speed driven gear 18 catches on the tip end of the protruding piston member 22 of the temperature sensitive actuating device 15, as shown in FIG. 5, wherein the choke valve 4 is held at the predetermined half-open position.

Therefore, when the engine E is restarted while hot, because the choke valve 4 is in a half-open state, the concentration of the air-fuel mixture generated in the intake path 3 is made appropriate for hot-starting. In particular, since the wax-type temperature sensitive actuating device 15 is relatively slow to respond to incoming heat as described above, good hot-starting performance is ensured by maintaining the protruding state of the piston member 22 for an extended time after the engine E has stopped running.

Figure 6:
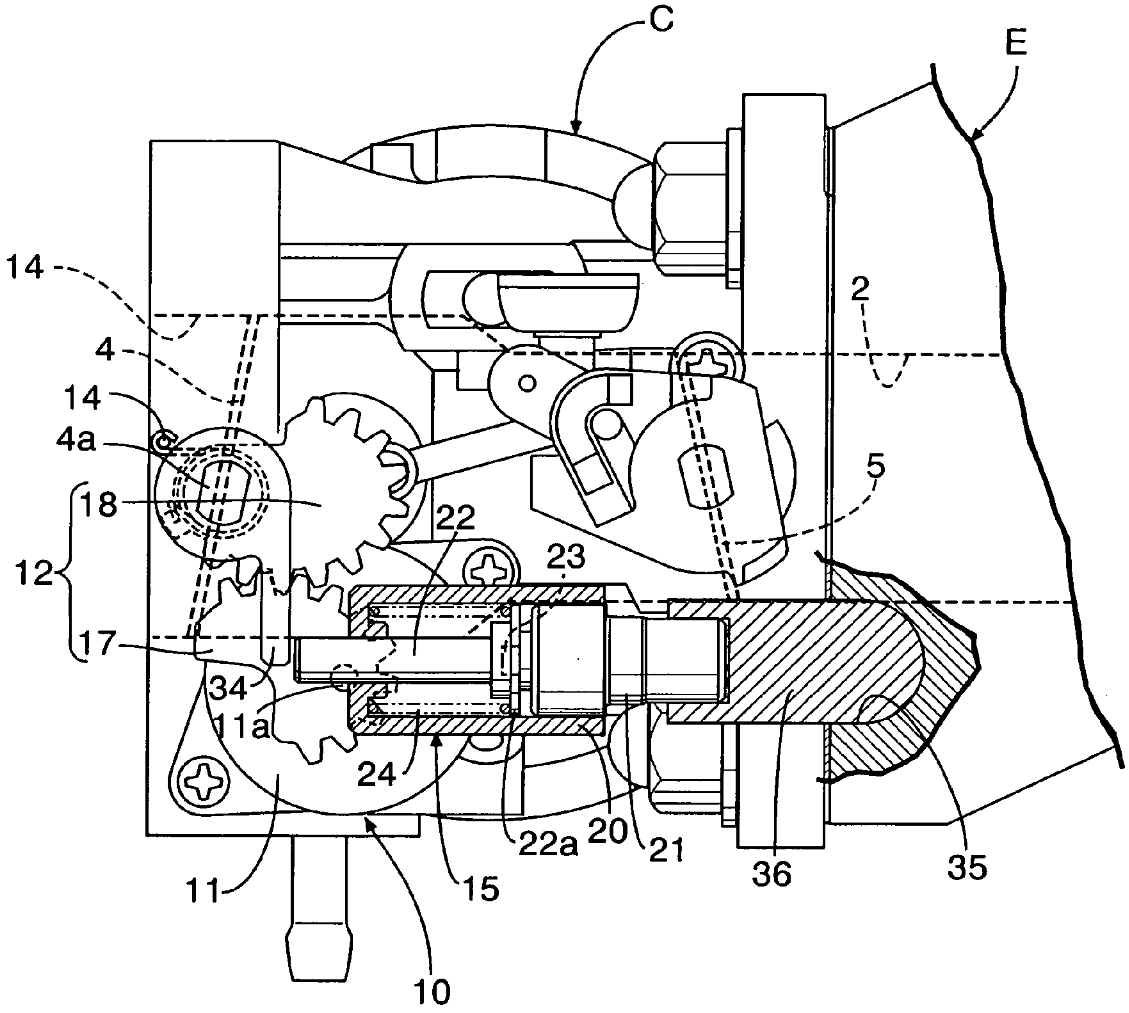
FIG. 6 is a plan view of a peripheral part of a carburetor according to a second embodiment of the present invention.

A second embodiment of the present invention is now explained by reference to FIG. 6.

The second embodiment directly uses the heat of the cylinder head 1 of the engine E to heat the wax case 21 of the wax-type temperature sensitive actuating device 15. Specifically, the wax-type temperature sensitive actuating device 15 is positioned so that the wax case 21 faces the cylinder head 1 side of the engine E. Fitted around the outer periphery of the wax case 21 is a heat transmitting member 36 with a tip end inserted into a depression 35 on an outer face of the cylinder head 1, thus transmitting heat of the cylinder head 1 to the wax case 21 via the heat transmitting member 36.

A stop lever 34 is secured to the choke valve shaft **4*a* while being superimposed on the non-constant speed driven gear 18. The piston member 22 of the temperature sensitive actuating device 15 is disposed to face the stop lever 34 so as to make contact with, or move away from, the stop lever 34 on a pivoting path of the stop lever 34 to the closed side of the choke valve 4. When the engine E stops in a hot state, closure of the choke valve 4 by the choke valve closure spring 14 is restricted by the stop lever 34 catching on the protruding piston member 22. As arrangement of the other parts is the same as that of the first embodiment, parts in FIG. 6** corresponding to those of the first embodiment are denoted by the same reference numerals and symbols, and the explanation thereof is omitted.

In accordance with the second embodiment, the wax case 21 is heated in response to an increase in the engine temperature without using the relatively costly PTC heater 34 of the first embodiment. Therefore, when the engine E is stopped in a hot state, a half-open state of the choke valve 4 is maintained by the piston member 22 in a protruding state, in the same manner as in the first embodiment, thereby ensuring good hot-start performance.

The present invention is not limited to the above-mentioned embodiments, and can be modified in a variety of ways without departing from the subject matter thereof. For example, the transmission device 12 may include a normal constant speed reduction gear. Further, the wax-type temperature sensitive actuating device 15 may be mounted on a fixed structure connected to the carburetor C.

What is claimed is:

1. An electrically-operated automatic choke system of a carburetor, the system comprising:

an electric motor;

a transmission device which transmits a drive torque of the electric motor to a choke valve of the carburetor to open and close the choke valve;

an electronic control unit for controlling operation of the electric motor;

a choke valve closure spring which is connected to the choke valve and urges the choke valve in a closing direction;

a temperature sensitive actuating device mounted on either one of the carburetor or a fixed structure connected to the carburetor, and comprising a piston member that protrudes therefrom upon expansion of a wax therewithin, the temperature sensitive actuating device receives heat generated by an engine; and a pivoting member which is coupled to the choke valve wherein the piston member faces the pivoting member and either contacts or moves away from the pivoting member on a pivoting path to a closed side of the choke valve, wherein closure of the choke valve by the choke valve closure spring is restricted according to an amount the piston member protrudes when the engine has stopped running.

2. The system according to claim 1, wherein the choke valve is inclined relative to a central axis of an intake path of the carburetor.

3. The system according to claim 2, wherein one side of the choke valve has a rotational radius that is larger on a downstream side of the intake path relative to the other side of the choke valve.

4. The system according to claim 1, wherein the temperature sensitive actuating device prevents the choke valve from being closed by the choke valve closure spring based on a temperature change of the engine.

5. The system according to claim 1, wherein the choke valve includes a valve shaft to which the pivoting member is secured, and wherein the valve shaft protrudes from the carburetor.

6. The system according to claim 1, wherein the wax provided within the temperature sensitive actuating device is contained within a case.

7. The system according to claim 6, wherein a heat transmitting member is fitted around a periphery of the case to transmit heat from a cylinder head of the engine to the case.

8. The system according to claim 1, wherein the choke valve includes a valve shaft to which a stop lever is secured, the stop lever being superimposed on the pivoting member.

9. The system according to claim 8, wherein the piston member faces the stop lever and makes contact with, and moves away from, the stop lever on a pivoting path thereof.

10. The system according to claim 9, wherein closure of the choke valve by the choke valve closure spring is restricted by the stop lever catching on the protruding piston member.

* * * * *